United States Patent
Itamar et al.

(10) Patent No.: US 10,311,022 B2
(45) Date of Patent: Jun. 4, 2019

(54) CDBMS (CLOUD DATABASE MANAGEMENT SYSTEM) DISTRIBUTED LOGICAL UNIT REPOSITORY

(71) Applicant: K2VIEW LTD., Yokneam Eilit (IL)

(72) Inventors: Einav Itamar, Naharia (IL); Achi Rotem, Yokneam Eilit (IL)

(73) Assignee: K2VIEW Ltd., Yokneam Eilit (IL)

(*) Notice: Subject to any disclaimer, the term of this patent is extended or adjusted under 35 U.S.C. 154(b) by 391 days.

(21) Appl. No.: 14/894,526

(22) PCT Filed: Jun. 12, 2014

(86) PCT No.: PCT/IL2014/050533
§ 371 (c)(1),
(2) Date: Nov. 30, 2015

(87) PCT Pub. No.: WO2014/207737
PCT Pub. Date: Dec. 31, 2014

(65) Prior Publication Data
US 2016/0140134 A1    May 19, 2016

Related U.S. Application Data

(60) Provisional application No. 61/838,652, filed on Jun. 24, 2013.

(51) Int. Cl.
G06F 16/11     (2019.01)
G06F 16/28     (2019.01)
(Continued)

(52) U.S. Cl.
CPC ........ G06F 16/128 (2019.01); G06F 16/1744 (2019.01); G06F 16/22 (2019.01); G06F 16/284 (2019.01); G06F 21/80 (2013.01)

(58) Field of Classification Search
None
See application file for complete search history.

(56) References Cited

U.S. PATENT DOCUMENTS 5,678,043 A    10/1997  Ng et al.
6,430,548 B1   8/2002   Deis et al.
(Continued)

OTHER PUBLICATIONS

Written Opinion and Search Report for PCT/IL2014/050533 Completed Sep. 11, 2014; dated Sep. 11, 2014 12 Pages.
(Continued)

Primary Examiner — Uyen T Le
(74) Attorney, Agent, or Firm — Wilmer Cutler Pickering Hale and Dorr LLP

(57) ABSTRACT

Systems and methods may implement database technology using distributed logical unit repositories (DLURs). DLURs may use a database structure related to a specific logical unit such as a customer, employee, or the like. Information used in DLUR database structures may include data, database structure, functions, and the like that helps form a complete model for a logical unit. In one embodiment, queries to a system concerning entities can be answered immediately by accessing a database using DLURs, which obviates the need to consult a number of databases in parallel and greatly reduces memory and time required to provide the requested information.

16 Claims, 5 Drawing Sheets

*Mortgage TABLE/DB*

| CID | Last Name | First Name | Mortgage Due... |
|---|---|---|---|
| 1 | Doe | John | $2,500 |

*Savings TABLE/DB*

| CID | Last Name | First Name | Savings | ... |
|---|---|---|---|---|
| 1 | Doe | John | $15,500 | ... |

*Transactions TABLE/DB*

| Transaction | Date | Time | CID |
|---|---|---|---|
| Withdrawal | 11.03.13 | 05:39 | 1 |
| Deposit | 12.03.13 | 17:38 | 1 |

*Mortgage TABLE/DB*

| CID | Last Name | First Name | Mortgage Due... |
|---|---|---|---|
| 2 | Roe | Jane | $3,000 | ... |

*Transactions TABLE/DB*

| Transaction | Date | Time | CID |
|---|---|---|---|
| Withdrawal | 11.03.13 | 15:37 | 2 |
| Deposit | 12.04.13 | 17:38 | 2 |

*Loan TABLE/DB*

| CID | Last Name | First Name | Loan | ... |
|---|---|---|---|---|
| 2 | Roe | Jane | $75,500 | ... |

(51) Int. Cl.
    *G06F 21/80*   (2013.01)
    *G06F 16/174*  (2019.01)
    *G06F 16/22*   (2019.01)

(56) References Cited

U.S. PATENT DOCUMENTS

| | | | | |
|---|---|---|---|---|
| 6,694,393 B1* | 2/2004 | Sutter, Jr. | ............... | G06F 9/445 |
| | | | | 710/68 |
| 8,140,794 B2* | 3/2012 | Prahlad | ............... | G06F 11/1451 |
| | | | | 707/639 |
| 8,706,833 B1* | 4/2014 | Bergant | ............ | G06F 17/30215 |
| | | | | 709/214 |
| 2002/0107871 A1 | 8/2002 | Wyzga et al. | | |
| 2003/0225780 A1 | 12/2003 | Adams et al. | | |
| 2004/0044664 A1* | 3/2004 | Cash | ................... | G06F 17/3061 |
| 2007/0027938 A1* | 2/2007 | Clarke | .............. | G06F 17/30368 |
| 2007/0185915 A1* | 8/2007 | Prahlad | ............... | G06F 11/1435 |
| 2008/0222163 A1 | 9/2008 | Hild et al. | | |
| 2008/0320258 A1* | 12/2008 | Wayda | ................ | G06F 11/1435 |
| | | | | 711/162 |
| 2009/0150377 A1 | 6/2009 | Gejdos et al. | | |
| 2010/0274772 A1* | 10/2010 | Samuels | ........... | G06F 17/30156 |
| | | | | 707/693 |
| 2011/0099420 A1 | 4/2011 | MacDonald McAlister et al. | | |
| 2011/0184912 A1* | 7/2011 | Baptist | ................ | G06F 11/1448 |
| | | | | 707/639 |
| 2012/0158659 A1* | 6/2012 | Marathe | ................ | G06F 16/907 |
| | | | | 707/639 |
| 2013/0106860 A1 | 5/2013 | De Pauw et al. | | |
| 2014/0330786 A1* | 11/2014 | John | ................ | G06F 17/30088 |
| | | | | 707/649 |

OTHER PUBLICATIONS

International Preliminary Report on Patenability for PCT/IL2014/050533 Completed Sep. 20, 2015 36 Pages.
European Search Report for 14816098.9 PCT/IL2014/050533 dated Jan. 1, 2017 8 Pages.

* cited by examiner

*Mortgage TABLE/DB*

| CID | Last Name | First Name | Mortgage Due... | |
|---|---|---|---|---|
| 1 | Doe | John | $2,500 | ... |
| 2 | Roe | Jane | $3,000 | ... |
| ... | | | | |

*Savings TABLE/DB*

| CID | Last Name | First Name | Savings | ... |
|---|---|---|---|---|
| 1 | Doe | John | $15,500 | ... |
| 3 | Shlabotnik | Joe | $35,000 | ... |
| ... | | | | |

*Loan TABLE/DB*

| CID | Last Name | First Name | Loan | ... |
|---|---|---|---|---|
| 2 | Roe | Jane | $75,000 | |
| 3 | Shlabotnik | Joe | $115,500 | ... |
| 4 | Soller | Eva | $5,000 | ... |
| ... | | | | |

*Transactions TABLE/DB*

| Transaction | Date | Time | CID |
|---|---|---|---|
| Withdrawal | 11.03.29 | 05:37 | 18 |
| Deposit | 11.03.29 | 05:38 | 22 |
| ... | | | |

Fig. 1

*Mortgage TABLE/DB*

| CID | Last Name | First Name | Mortgage Due... |
|---|---|---|---|
| 1 | Doe | John | $2,500 |

*Savings TABLE/DB*

| CID | Last Name | First Name | Savings | ... |
|---|---|---|---|---|
| 1 | Doe | John | $15,500 | ... |

*Transactions TABLE/DB*

| Transaction | Date | Time | CID |
|---|---|---|---|
| Withdrawal | 11.03.13 | 05:39 | 1 |
| Deposit | 12.03.13 | 17:38 | 1 |

Fig. 2

*Mortgage TABLE/DB*

| CID | Last Name | First Name | Mortgage Due... | |
|-----|-----------|------------|-----------------|---|
| 2   | Roe       | Jane       | $3,000          | ... |

*Transactions TABLE/DB*

| Transaction | Date     | Time  | CID |
|-------------|----------|-------|-----|
| Withdrawal  | 11.03.13 | 15:37 | 2   |
| Deposit     | 12.04.13 | 17:38 | 2   |

*Loan TABLE/DB*

| CID | Last Name | First Name | Loan    | |
|-----|-----------|------------|---------|---|
| 2   | Roe       | Jane       | $75,500 | ... |

Fig. 3

*DLUR*

*Mortgage TABLE/DB*

1
| CID | Last Name | First Name | Mortgage Due... |
|---|---|---|---|
| 1 | Doe | John | $2,500 |

*Transactions TABLE/DB*

| Transaction | Date | Time | CID |
|---|---|---|---|
| Withdrawal | 11.03.13 | 05:39 | 1 |
| Deposit | 12.03.13 | 17:38 | 1 |

*Savings TABLE/DB*

| CID | Last Name | First Name | Savings | ... |
|---|---|---|---|---|
| 1 | Doe | John | $15,500 | ... |

*Mortgage TABLE/DB*

2
| CID | Last Name | First Name | Mortgage Due... |
|---|---|---|---|
| 2 | Roe | Jane | $3,000 | ... |

*Transactions TABLE/DB*

| Transaction | Date | Time | CID |
|---|---|---|---|
| Withdrawal | 11.03.13 | 15:37 | 2 |
| Deposit | 12.04.13 | 17:38 | 2 |

*Loan TABLE/DB*

| CID | Last Name | First Name | Loan | ... |
|---|---|---|---|---|
| 2 | Roe | Jane | $75,500 | ... |

Fig. 4

CDBMS (CLOUD DATABASE MANAGEMENT SYSTEM) DISTRIBUTED LOGICAL UNIT REPOSITORY

FIELD OF THE INVENTION

The present invention relates to the field of database systems and methods.

BACKGROUND OF THE INVENTION

In the fields requiring database management there is a continuing demand for integration and consolidation of information from diverse systems containing complementary information, and methods for the access thereof. This is a result of various forces at play including the relentless increase of system size and amount of data dealt with in single companies, as a result of agglomeration of smaller into larger companies, as a result of increasing demand for longer time periods being studied and greater detail of information stored over these time periods, and a result of smaller information systems being similarly incorporated into larger information systems.

Telecom, financial, and communications enterprises all feel this need as the basic technologies become more and more widely adopted and numbers of users for a given enterprise rise exponentially.

As will be well-known to one skilled in the art, the process of integration and consolidation of information from various sources can be very expensive in terms of manpower and time. The downtime involved can decrease productivity and the process as a whole carries certain risks of damaging data integrity, freshness, and security. These are critical issues for the current and future operation of many modern businesses and therefore there is immense pressure on the entity carrying out the integration/consolidation to perform flawlessly and rapidly, which, as will be appreciated even by the layman, are requirements at fundamental cross purposes.

Some of the difficulties inherent in consolidation concern synchronization issues between different systems that are being continually updated, perhaps asynchronously, in near-real time, or real time; incorporation of legacy systems using outdated and/or obsolete hardware and/or software; requirements to keep systems running while updating or replacing them; storage and speed problems encountered with systems that grow to immense proportions, and others.

There is thus a long felt need for systems that will answer such needs in a time- and space-efficient manner, rapidly, and modularly.

SUMMARY OF THE INVENTION

The invention comprises systems and methods for implementation of database technology using 'Distributed logical unit repositories' (DLUR). This is a new way of storing data and access methods therefor. The DLUR contains information related to a specific logical unit.

The logical unit here is for example a customer, user, account, company, or the like; any entity that can conceivably tracked or recorded in a database, is considered a logical unit for purposes of the invention.

Each customer of (for example) a bank may have information stored in a number of databases; if s/he has a mortgage, information concerning the mortgage will generally be stored in a special mortgage database having multiple entries, one or more for each mortgage holder. The customer's mortgage information may be represented as a row in a table of information having many such rows, with different columns for relevant fields such as mortgage start date, amount, customer name, ID, etc.

The customer will have multiple such rows, one or more for each different relevant table and or database; for example the customer may have one or more rows in a savings table and/or database, credit card tables and/or database, and the like.

Each database may have further information such as database schema, functions, procedures, constraints, indexes, and the like. Functions may be provided that (for example) can be used to provide a serial number, or for a more complex example calculate tax for a particular customer given mortgage information, income information and the like, possibly coming from several different tables and or databases.

The crux of the invention is to store all information from all tables and from all databases for a given customer (or other logical unit) in a single "row" or entry of a data store. Each such row represents a single customer (or logical unit). Each such row contains a logical unit ID column, and one or more data objects or "blob" columns; Additional columns may contain additional logical unit properties that will be used to filter logical operations. The blob column(s) contain all the data together with the entire schema, functions, sequences, constraints, procedures, and any other database object pertaining to a given logical unit.

The blob is stored in a highly compressed, uniquely encrypted format. Algorithms known in the art are employed to compress and decompress the DLUR entries rapidly, and as will be clear to one skilled in the art, since the size of a single DLUR may be far smaller than that of an entire relational database, searches for information concerning a single customer or other logical unit are correspondingly faster.

The DLUR are stored as database entries, in a database having standard components. This database may contain many such entries, using standard methods of accessing entries, storing entries, and the like. As explained above, the DLUR entries themselves contain snapshots of the separated databases with information concerning database structures, functions, and data pertaining to particular logical units, for example customers, accounts, lines, etc.

It is within the provision of the invention that the consolidated database further consists of a 'data freshness indicator' that contains the creation date of every snapshot portion. This function allows the system to refresh the data in the snapshots on demand. Whenever, a query is submitted regarding a specific logical unit, the system deducts the age of every specific portion of the queried snapshot using parameters such as current date and the 'data freshness indicator'. Then, the system decides whether the snapshot needs to be updated. If the system decides thattere are outdated portions, the system updates the snapshot in the appropriate manner. Finally, the system answers the query using data from an up to date snapshot.

It is to be mentioned that updating the whole snapshot as opposed to updating the specific outdated portion within the snapshot, is also within the provision of the invention.

One advantage of an embodiment that utilizes the 'snapshot freshness indicator' is that the system will not waste resources on constantly updating the consolidated database. Instead, the system will update snapshots regarding specific logical units on-demand whenever a query is submitted on said logical unit.

It is within the provision of the invention that the data portion contains multiple snapshots of same logical unit forming version history of previous snapshots stored in data portion.

One advantage of an embodiment that utilizes the storage of multiple snapshots of the same is that the logical unit, is that the system may restore and revert to past versions of the snapshot without the need to store backups of every single separated database. Instead, data backup is done on the consolidated database level, allowing quick and efficient data restoration.

The foregoing embodiments of the invention have been described and illustrated in conjunction with systems and methods thereof, which are meant to be merely illustrative, and not limiting. Furthermore just as every particular reference may embody particular methods/systems, yet not require such, ultimately such teaching is meant for all expressions notwithstanding the use of particular embodiments.

Amongst the unique elements of the inventive concept we emphasize:
1. distribution of data in any paradigm
2. The system allows parallel processing of entities, using the mapReduce concept.
3. Performance having the speed of local memory but the cost of disk storage
4. Encryption on the entity level (the most secured database)
5. Versioning of the entire entity database
6. Sql Structured Query Language (SQL) on a distributed big-data structure and unstructured data
7. Additional unique features:
    a. Service Level Agreement (SLA) to prioritize requests
    b. Controllable accuracy level of response (e.g. for the case of averages across all entities; one can specify the result to be 96% statistically accurate, and appropriate sampling will be executed automatically on the number of entities required to provide the requested accuracy)
    c. Each entity DB is synced with its data across all source systems
    d. Different entity types can reside in internal/external cloud

BRIEF DESCRIPTION OF THE DRAWINGS

Embodiments and features of the present invention are described herein in conjunction with the following drawings:

FIG. 1 is a simplified depiction of a set of databases consistent with current practice;

FIG. 2 is a simplified depiction of a single logical unit's entries in a set of databases;

FIG. 3 is a simplified depiction of a single logical unit's entries in a set of databases;

FIG. 4 is a representation consistent with one embodiment of the invention.

Figure 5:
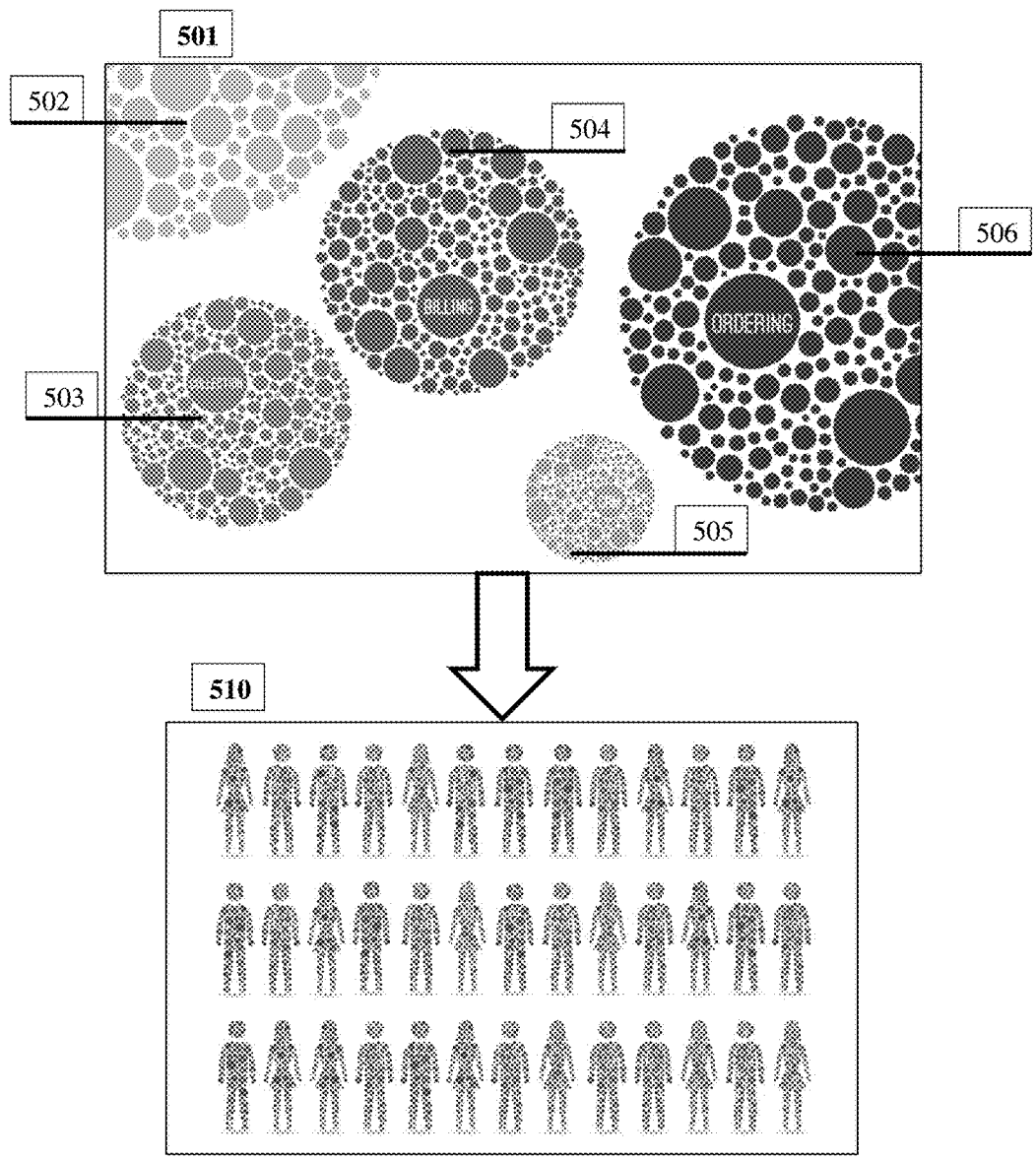
FIG. 5 is a conceptual representation of the inventive paradigm.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

The invention comprises systems and methods for implementation of database technology using 'Distributed logical unit repositories' (DLUR). This is a new system and method for storage and access of data, and methods for use thereof. The DLUR contains information related to a specific logical unit.

Information concerning customers, workers, accounts, or other entities is today generally stored in a set of databases, often with different databases covering different information relevant to a particular logical unit. For example, a bank may store information concerning its customers, which are the basic logical unit of concern. One database covers checks, another may contain information concerning mortgages, another concerning loans, another contains investment information, etc. Thus a single customer who has a checking account and mortgage will appear in at least two separate databases. When this customer approaches to request a loan, information on the customer must now be pulled from multiple separate databases to form a complete picture; the customer's saving account, banking account, investment portfolio, credit history etc. might all be required to form an accurate judgment as to the customer's loan risk.

As a further example an employer may maintain a database of worker hours, another database of salary information, yet another database of pension information, and a further database of insurance records. As in the previous example, queries will often relate to a particular employee (for example, what is the total employee 'performance record' as defined by some key performance index). In such cases it would make more sense to store information by employee rather than by topic.

Generally speaking it so transpires that a large proportion of the queries with which information systems are interrogated, concern particular entities such as individual customers, accounts, telephone lines, or the like. Therefore storage of information by 'topic' (e.g. loans/checks/savings for a bank customer) instead of by logical unit is fundamentally less suited for such queries, than storage of information by logical unit. This is a matter of practical consequence; if information is stored by logical unit then queries concerning entities will involve selecting single records from a database of such records, and the amount of local storage required will be a function of the amount of information pertaining to a single logical unit. However if information is stored by topic then the amount of storage is potentially a function of the total number of entities. The number of entities can potentially be thousands of times greater than the number of records concerning a single logical unit; for example a medium/large bank may have hundreds of thousands or even millions of customers, while the number of records for a given customer will potentially be in the hundreds or thousands of individual transactions. Therefore the immediate storage requirements for the inventive approach of storage by logical unit are correspondingly potentially thousands of times smaller than those of the standard database means.

The Distributed logical unit repository or 'DLUR' of the invention has several distinguishing useful features. It does not require maintenance; it stores information in a compressed format of approximately $\frac{1}{10}$ the space of the original; it is of unlimited size; it implements business logic at a basic level, not just in the data store; it allows unrestricted queries, without requiring foreknowledge of query content; it is significantly faster than existing solutions; it allows automatic synchronization between different systems in an organization or across organizations, such that the data base is continuously updated against the production version, where the data may potentially be stored in a number of different systems each potentially having differing levels of security; it allows saving versions of data, which in turn allows one to observe changes in an logical unit over time; it implements an unstructured database with ANSI SQL support; and it allows one to access the data using known, accepted standards.

Current database integration solutions do not take into account the notion of 'logical unit' or 'object' as currently understood in computer science. Thus the user must filter information received in each query. Furthermore, far more memory is used for existing solutions than is strictly necessary (in light of the inventive system and method). Current systems require maintenance, which the inventive system does not. The solutions currently available in the business intelligence space require the user to define the type of query that will be asked aforehand, not allowing for complete flexibility of query in realtime or near real time. Furthermore it is not necessarily the case that different versions of a given database are supported by extant solutions. Finally the inventive methods are significantly faster than existing methods using the same hardware.

Current business intelligence (BI) solutions require precise definitions of the queries to be made for every campaign or step. There is a corresponding requirement to predefine the relevant aggregation functions. In contrast, the inventive system allows for spontaneous enquiries without preconceived definitions.

The invention comprises a basic BI layer. Key performance indicators (KPI) are defined allowing the user to quantify business performance in forming queries. The KPI's can include aggregate factors (aggregated across databases, entities, and the like).

In contrast to current, the inventive systems and methods allow for answering a query involving multiple tables with complex calculations and aggregations at speeds providing a significant advance over the state of the art. It should be appreciated that the number of logical units does not affect the memory required of the system, nor the speed of performance, for any and all operations performed on single logical units. The same performance is achieved for a system with two entries as for a system with two billion entries. This is in stark contrast to extant systems whose performance (speed) degrades and memory requirements increase with increasing number of entities.

The greatly increased speed of the system allows for immediate receipt of answers without noticeable latency. However to allow for this performance the inventive systems and methods require novel components for data gathering, indexing, compression, and decompression, in keeping with the overall system architecture, and in keeping with memory limits, computational limits, and throughput limits. Additionally there is a requirement to maintain currency (up-to-date data) of DB records which require development of novel incremental and/or batch synchronization.

A further central difficulty steps from the definition of special-purpose KPI's and the running of complex queries, for example queries spanning multiple entities relating to relative measures across different populations. In such cases, with today's technology one would have to invoke an aggregation of data from several systems, a computation liable to be technologically complex, requiring multiple engines running on a multiple systems simultaneously. Furthermore, a memory problem may be encountered; large amounts of data may be involved and aggregated, and the results stored in memory. In some cases gigabytes of data may be involved, comprising hundreds or thousands of tables and millions or billions of entries in each table.

Additionally the complexity of integration between systems leads to situations wherein within a single table there may be multiple lookups of various varieties, each of which requires publishing different API's which must be unique in order to prevent duplicates, which would thwart the integrity of data.

There are multiple possible solutions to these problems which are within provision of the invention.
 1. Editing and adaptation of synchronization procedure to a particular solution, allowing data transfer either incrementally or in batch;
 2. Development of complementary methods for data retrieval.

FIG. 1 illustrates a system diagram consistent with one embodiment of the invention. Here various tables and or databases of a fictitious bank are shown; a mortgage table/database contains mortgage holder customer IDs (CIDs), names, payments due, remaining principal, etc. This database will contain functions such as payment due calculation, tax calculation, remaining principle calculation, and the like. Furthermore there may be logical links and relations to other databases; for instance a tax calculation may have to take into account both savings, loan, and mortgage information to perform a correct tax due calculation for use in one or more databases.

A transactions table and or database contains a serial list of transactions, listed by date, with information such as transaction type, date and time, customer ID, etc. as well as associated functions, relations to external databases, and the like.

Similarly a savings table and or database contains name, amount in savings, etc. and a loan database contains CID, name, loan amount, etc.

In other fields, similar multiple databases might be found, such as customer relationship management (CRM), billing, payroll, and the like.

Given the setup of FIG. 1, we can now describe the method whereby a customer's information is retrieved when he or she presents at the bank teller window. The teller enters a customer name or ID, and each database is queried for information relevant to that CID; when the databases involved have thousands or millions of entries, this can be an expensive operation in terms of memory and time.

Instead of this method, the current invention introduces the novel step of taking a 'snapshot' of all entries relevant to a given logical unit (such as the customer having CID of one, John Doe, as shown in FIG. 2) As will be appreciated from the figure, only entries having to do with this CID are taken, but the database structure, functions, links and the like are all taken into consideration as well for the following step. Since John Doe does not have any loans, there is no loan database entry for John Doe in the snapshot.

FIG. 3 shows a similar snapshot of information pertaining to CID two, namely Jane Roe. Since Jane does not have any savings, there is no savings entry for her in the snapshot.

In FIG. 4 the DLUR database is shown; here there are two columns, namely CID and a data 'blob', which is in fact the snapshots referred to in FIGS. 2,3. These snapshots, containing data, functions, indexes, procedures, sequences, constraints, and the like, are compressed, encrypted, and stored as entries in a database such as that illustrated in FIG. 4.

As will be appreciated by the attentive reader, when a customer presents at a teller window of a bank employing the method illustrated in FIG. 4, the customer may be identified by CID, and his entire data snapshot then decrypted, expanded, and accessed. Since the amount of information in this case is only that associated with a single customer, the required time and memory necessary for these operations are drastically reduced compared to the situation of current practice such as is illustrated in FIG. 1.

Another example of the use of the invention is for calculation of the likelihood that a given customer will pay a given loan installment. It is a simple matter, given all information concerning a customer's financial state and history, to determine this likelihood. However, such a calculation using the standard database setup could be of astronomical computational cost for a large bank having many customers.

It is within provision of the invention that it be implemented for use in 'software as service' setups. For example, a back-office services company may provide database services for a number of other companies over the web. Instead of opening a separate database for each customer (which might be necessary given that every customer may have different database structure and needs), the current method allows for a single database to be used that contains database information associated with all customers.

It is within provision of the invention that the database structures be generated fully by the inventive method itself (instead of withdrawing database information and structure from extant external databases), by providing database creation means and methods.

It is within provision of the invention that the external databases depicted for example in FIG. 1 be eliminated once the information therein is stored in the inventive database shown for example in FIG. 4. It is further within provision of the invention that it be 'backwards compatible' in the sense that queries intended for the original databases (e.g. of FIG. 1) be used, as is, with the snapshots stored in the inventive database (e.g. of FIG. 4). As will be appreciated by the attentive reader, since the snapshots are accurate representations of the original databases, including relations therebetween, functions, constraints, etc., the snapshots contain all the necessary information to respond to queries in the exact manner in which the original databases would respond.

FIG. 5 shows a conceptual representation of the inventive paradigm. Instead of individual systems each with its tables such as in set 501 consisting of ordering, billing, CRM, collections, and other tables having one or more entries for each individual, the inventive system 510 organizes elements at the level of the individual; each individual DLUR contains the information from all systems and tables, concerning that individual. Thus each of the DLUR's 510 contains the elements from multiple systems/tables of 501, storing by individual instead of table.

It is within provision of the invention that the operations described above be dynamic, in the sense that a given snapshot can be updated with a different structure and data when necessary (for example when a customer takes out a new loan, requiring a new entry in a loan database).

It is within provision of the invention that the logical units referred to above be any logical unit, such as customer, account, phone line, company, business unit, division, office, or the like.

It is within provision of the invention that different versions of a given snapshot be stored, for example storing a version of the current snapshot every time it changes, or every Nth time it changes, every day, every week, or the like. In this way a given logical unit's history can be easily followed.

It is within provision of the invention to implement database systems and methods adapted for use with generic applications, business intelligence applications, real-time prediction, software-as-service (cloud apps), and other implementations as will be clear to one skilled in the art. been presented for the purposes of illustration. It is not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

The invention claimed is:

1. A system for storing data, comprising:
a processor; and
a logical unit database configured to be accessed by the processor,
wherein the logical unit database contains a plurality of entries for a single logical unit, each entry comprising an identification (ID) and a snapshot data portion,
wherein a first data portion corresponding to a first snapshot data portion of a first entry of the plurality of entries is contained in a first database that is separate from the logical unit database, and
wherein a second data portion corresponding to a second snapshot data portion of a second entry of the plurality of entries is contained in a second database that is separate from the logical unit database and from the first database.

2. The system of claim 1, wherein the snapshot data portion comprises an indicator that indicates a last revision time of the snapshot data portion.

3. The system of claim 1, wherein the snapshot data portion of at least one entry of the plurality of entries comprises multiple snapshots forming a version history of previous snapshots for the at least one entry.

4. The system of claim 1, wherein the snapshot data portion is compressed.

5. The system of claim 4, wherein the compressed snapshot data portion is stored in a binary form.

6. The system of claim 5, wherein the compressed snapshot data portion is stored in an encrypted form.

7. The system of claim 1, wherein the ID is an entry that identifies the corresponding logical unit.

8. The system of claim 1, wherein the ID corresponds to a single customer and the information in the logical unit comprises information for the single customer.

9. The system of claim 1, wherein the logical unit database contains only entries for the single logical unit.

10. The system of claim 1, wherein the first snapshot data portion is configured to be updated when the first database changes the first data portion, and the second snapshot data portion is configured to be updated when the second database changes the second data portion.

11. A method for storing data regarding a logical unit, comprising:
assembling information from a plurality of extant databases, the information including a first data portion from a first database and a second data portion from a second database, wherein the assembled information pertains to a single logical unit;

forming a snapshot of the logical unit using the assembled information, wherein the snapshot is configured to be updated when one or more of the plurality of extant databases changes the information; and storing the snapshot in a data portion of a logical unit database, wherein the logical unit database is separate from the extant databases.

12. The method of claim 11, further comprising:

storing multiple snapshots regarding the single logical unit in the data portion, wherein the multiple snapshots form a version history of previous snapshots stored in the data portion.

13. The method of claim 11, further comprising compressing the snapshot.

14. The method of claim 13, wherein the compressed snapshot is stored in a binary form.

15. The method of claim 14, further comprising encrypting the compressed snapshot.

16. A method for retrieving data, comprising:

defining a threshold that specifies an age of data;

receiving a query regarding a single logical unit, determining whether a data age associated with a snapshot of information pertaining to the single logical unit exceeds the threshold based on an indicator of the logical unit, wherein the indicator reflects when a snapshot of the single logical unit was created or revised, and wherein the information pertaining to the single logical unit is contained in a plurality of databases separate from a database storing the single logical unit;

updating at least one outdated portion of the snapshot when the data age exceeds the threshold, wherein the outdated portion corresponds to a portion of the information pertaining to only the single logical unit contained in the plurality of databases that has changed; and fulfilling the query based on the snapshot.

* * * * *